(12) United States Patent
Bolyard

(10) Patent No.: US 7,501,712 B2
(45) Date of Patent: Mar. 10, 2009

(54) PROCESS FOR USING WASTE WATER FROM COMMUNITY SEWER SYSTEMS TO GENERATE ELECTRICAL POWER

(76) Inventor: David Bolyard, 159 Empire Pl., Inswood, WV (US) 25428

(*) Notice: Subject to any disclaimer, the term of this patent is extended or adjusted under 35 U.S.C. 154(b) by 71 days.

(21) Appl. No.: 11/533,784

(22) Filed: Sep. 21, 2006

(65) Prior Publication Data

US 2007/0212213 A1    Sep. 13, 2007

Related U.S. Application Data

(60) Provisional application No. 60/767,208, filed on Mar. 10, 2006.

(51) Int. Cl.
*F03B 13/00*    (2006.01)
(52) U.S. Cl. .......................... 290/43; 290/54
(58) Field of Classification Search ............ 60/398; 290/43, 54
See application file for complete search history.

(56) References Cited

U.S. PATENT DOCUMENTS

| | | | |
|---|---|---|---|
| 3,820,965 A | 6/1974 | New | |
| 4,115,879 A | 9/1978 | Toms | |
| 4,352,025 A * | 9/1982 | Troyen | 290/54 |
| 5,389,821 A * | 2/1995 | Moulliet | 290/54 |
| 5,742,515 A | 4/1998 | Runkle et al. | |
| 6,100,600 A | 8/2000 | Pflanz | |
| 6,531,788 B2 * | 3/2003 | Robson | 290/54 |
| 2005/0103363 A1 | 5/2005 | Roles, Jr. | |
| 2005/0248161 A1 | 11/2005 | Heidel | |

FOREIGN PATENT DOCUMENTS

WO    2005052361    6/2005

* cited by examiner

*Primary Examiner*—Michael Leslie
(74) *Attorney, Agent, or Firm*—Michael L. Greenberg, Esq.; Greenberg & Lieberman, LLC

(57) ABSTRACT

Turbines are attached to the out-flow discharge drain lines of public sewer systems to convert the kinetic energy of the flowing and often pressurized waste water to electrical energy, by using Hydro-Generators and conducting this new electrical power back to the power grid for the local community. It meets increasing consumer demand for more public services like water/sewer/electricity generating electrical power using the resources that are already at hand, and must dispose of on a daily basis. It will be able to meet the future demands of a growing population. It is harmless to the environment and will automatically increase the electrical supply as the demand continues to increase.

7 Claims, 1 Drawing Sheet

PROCESS FOR USING WASTE WATER FROM COMMUNITY SEWER SYSTEMS TO GENERATE ELECTRICAL POWER

CONTINUITY DATA

This is a nonprovisional of U.S. patent application Ser. No. 60/767208 filed on Mar. 10, 2006, and priority is claimed thereto.

FIELD OF THE INVENTION

The field of endeavor that pertains to the present invention is the generation of electricity, using the discarded flow of wastewater; specifically the generation of electricity using hydroelectric processes.

BACKGROUND OF THE INVENTION

Electricity generated for the use of society is usually generated by dams, wind power, gas and coal generating plants, and nuclear power. Each method has its drawbacks to today's society and to the environment specifically.

Dams slow the natural flow of rivers and prevent fish from navigating to their spawning grounds upriver. Wind power is non-polluting to the air, but poses a negative impact on migrating birds as well as affecting the pristine environment of the mountains, where mills are installed. Gas and coal generating plants pollute the environment by the simple fact that they release fuels when they are burnt to generate electrical power. Nuclear power is a costly process and produces a radioactive spent fuel byproduct that is very expensive to dispose of and will remain radioactive for 10,000 years.

Prior art includes U.S. Pat. No. 3,820,965 issued to New on Jun. 28, 1974. It is a method of reducing environmental pollution by utilizing stack gases, resulting from the burning of fossil fuels, and water, including sea water and waste water, to manufacture hydrocarbon energy fuel, potable water and other commercial products. U.S. Pat. No. 4,115,879 issued to Toms on Sep. 26, 1978 is a water recirculation system. U.S. Pat. No. 5,742,515 issued to Runkle et al. on Apr. 21, 1998 is an asynchronous conversion method and apparatus for use with variable speed turbine hydroelectric generation. U.S. Pat. No. 6,100,600 issued to Pflanz on Aug. 8, 2000 is a maritime power plant system with processes for producing, storing and consuming regenerative energy. US Publication 2005/0103363 published for Roles, Jr. on May 19, 2005 is an assembly and system for isolation of wastewater in outdoor, open-air wash station. US Publication 2005/0248161 published for Heidel on Nov. 10, 2005, is a process of using hydraulic turbines attached to water mains, water towers, sewage lines, aqueducts, and pipelines to generate electricity by the pressurized flowing of water and sewage through said mains, towers, lines, aqueducts, and pipes impinging upon the turbine blades, and changing the kinetic energy of the flowing fluid into useable electric energy by use of a nearby generator and conducting that energy from the generator to a power substation by means of a conduction pipe and selling consumers back this new electricity which they have created themselves by their demand for utilities. WO Publication 2005/052361 published for Patel on Jun. 9, 2005 is an electrical power generating plant by using kinetic energy of water waves or water flow.

There is a need for a process of using hydro-water turbines attached to the outflow pipes of the community sewer systems to generate electricity utilizing the constant flow of the public sewer systems' discharged waters. The kinetic energy of the discharged waste water will be converted to electrical energy by having the force of the discharged water striking the turbine blades and extracting useable electrical energy from the discarded waste water. Electricity generated by the inline water turbines will be sent back to the local power company by waterproof wires attached directly to the turbine generators.

SUMMARY OF THE INVENTION

Most of the electrical power produced worldwide is made by the means of hydroelectricity—using waterpower to generate energy. This is where the present invention comes into effect as a new way to generate electricity using an overlooked source of waterpower generation. The present invention has many advantages:

Every community has a public sewer system discharging waste water, and this water can be used to generate kinetic energy All sewer lines are located close to roads and existing power lines that serve the local communities.

As the populations increase in a given area the power output increases by the increased waste water flow.

The waste water used in this method of power generation takes advantage of the sewer systems filtration system of removing solids from the waste water before the waste water is used to power the turbines.

This new use of generating electrical power will lessen the need for additional power generation plants.

There are no harmful side effects in this process of generating electrical power Rain water and snow runoff will only increase the electrical power generated by this system.

The installation of this process will create more jobs for the local communities.

This power generation will be installed below ground attached to the existing out-flow pipes and will be not be apparent to the observing public.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
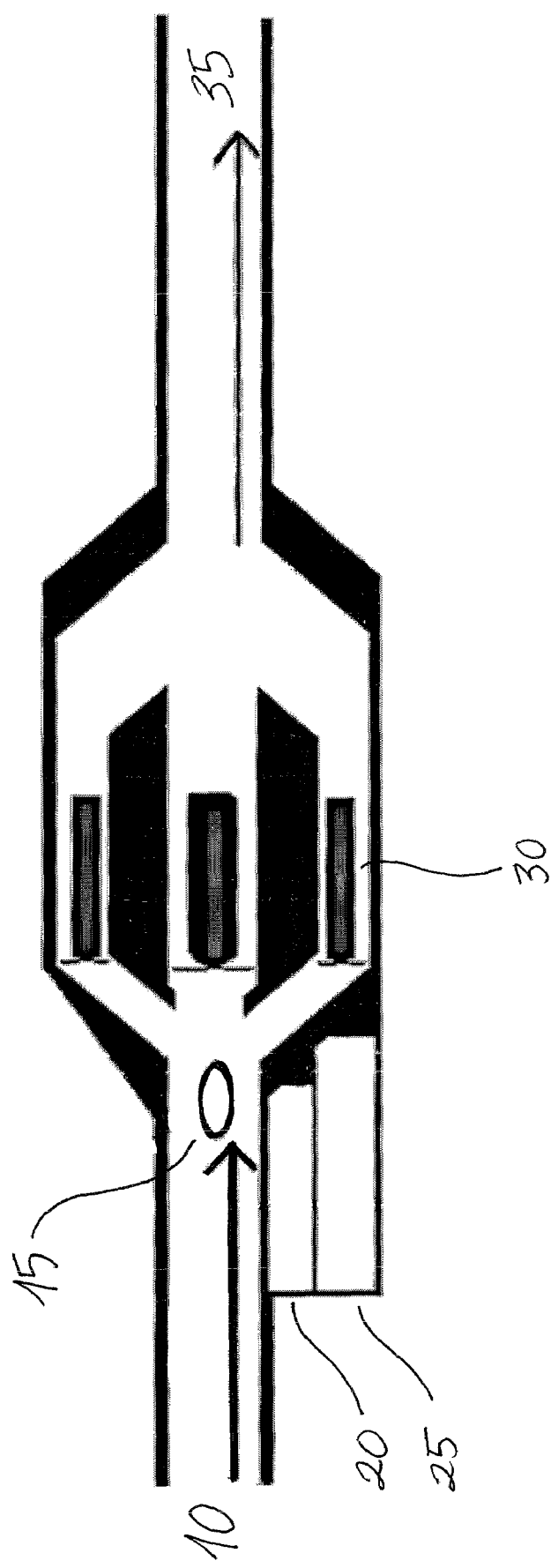
FIG. 1 is an environmental view of the present invention.

In FIG. 1 the present invention is shown with outflow wastewater pipe 10, computer controlled gate flapper 15 to direct the flow of water at all times, electric cable room 20 and computer control room 25. Turbines 30 are located near the wastewater pipe 10. Water flows out disposal tube 35. Arrows denote movement of water in FIG. 1. The system once installed on the outflow drainage lines of the sewer system will be below ground and will not be seen except for the telephone pole supplying electricity to run the computer system and the return power lines feeding power back to the power grid.

The system attaches to the outflow disposal lines 10 of the local sewer system. The wastewater is channeled by the gate flapper control 15 to the turbine generators 30. Each outflow pipe 10 will be monitored before installation of the generating system to determine the amount of water that passes through the waste lines on a yearly and daily basis. Once the average output is determined, the appropriate sized generating system will be installed to generate electrical power for the community.

The system is designed to accommodate sudden increases of water flow due to high use of the sewer system, storm runoff etc. by the computer-controlled flapper gate 15 which senses the increase in water flow and automatically directs the outgoing waste water to the center and both side turbines 30. If the wastewater flow continues to increase the computer system 25 will also feather the blades, to allow the wastewater to exit the system preventing a sudden back up of the community drainage system. When conditions allow, the computer system 25 returns the flapper gate 15 to normal operating position and increases the feathered blades to full operating position for power generation.

Every community that has a public sewer system must discharge thousands of gallons of wastewater from their systems daily. The average person in this country uses 125 gallons of water on a daily basis by taking baths, washing clothes, brushing their teeth and shampooing their hair.

All that water moves through the sewer systems of every community in this nation and all the nations of the world. The present invention places a turbine generator 30 in the outflow pipes 10 of every sewer system to generate electrical power from this unused and overlooked source of flowing water. Every sewer system must pump the wastewater from their systems and dump the excess water in the streams and rivers. Often the systems must pump the water under pressure to make sure the community system continues to operate without backing up. The wastewater is dumped as much as possible flowing down hill and dumping into the rivers. Sometimes the water must be pumped into the rivers to ensure proper cleansing of the public sewer system.

Regardless of whether the wastewater is pumped or allowed to drain using gravity, the tremendous volumes of water produced by every community can be a new source of generating electrical power. A small community of 10,000 people produces over 1-¼ million gallons of wastewater on a daily basis. Electricity produced from this water flow could generate millions of watts of power. Flowing water only has to fall a few feet, to turn the blades of water turbines to generate electricity. The process of using hydraulic turbine generators can be installed in the outflow drains of the public sewer systems throughout the nation. Using this process, every community could generate electrical power from their own public sewer system drains. The power generated would greatly benefit the local community with added revenue.

The present invention would be an add-on to the existing public sewer pipes, which drain the discharged drain water from the sentiment tanks of the public systems and dispose of it in the rivers and streams.

The system would be installed at or near the end of the outflow drains of the public systems. Local power lines are nearby to supply electricity to the sewage treatment plants. The same power lines could be attached to supply electricity to power the lights and the computers. There are computer-controlled flapper gates to run the system of computer-controlled wastewater power generation.

Wastewater from the outflow pipes are channeled into the present invention's system of power generating turbines. The computer-controlled gate flapper would constantly monitor the water flow being produced by the public system. When the water supply entering the system equals the estimated volume predicted for the system, then the gate flapper would allow the wastewater to reach the center or largest capacity turbine generator. When the supplied wastewater exceeds the estimated volume of wastewater the gate flapper computer would adjust the gate flapper to allow water to also reach the two outside smaller turbines, which would take advantage of the additional water flow to produce an even greater amount of electric power, for as long as the flow has increased.

If the volume of water continues to increase, the computer would feather the blades of the two outside turbines, to allow faster water drainage and to prevent damage to the turbines or backing up of the public drainage system. The blades of the larger prop could also be trimmed if necessary. When the volume returns to the estimated flow, the computer readjusts the gate flapper to normal water flow and power generation.

The present invention also accounts for a failsafe system. During times of interrupted power from the power company due to storms in the area, the system would go on battery backup, long enough for the computer to switch over to my turbine system of power generation. When the power company is back on line, the system's computers automatically switch back to the power company's electrical supply.

There would be two electric meters for the system. The first meter is a typical meter like the one everyone has attached to the home. First meter tells the amount of electricity consumed to run a household or to supply power for a business.

The second meter attached to the outgoing power from the wastewater turbines shows how much power has been produced and supplied back to the local power company.

What is claimed is:

1. A method of generating electrical power from wastewater, comprising:
   placing turbine generators at the mouth of outflow sewer systems;
   attaching the turbine generators to out-flow discharge drain lines of public sewer systems;
   supplying electricity to run a computer system;
   monitoring the wastewater flow to obtain an estimated volume;
   supplying the wastewater to smaller turbine generators when the volume of the wastewater exceeds the estimated volume of the wastewater; and
   using wastewater to turn the blades of the turbine generators, thereby creating electric energy.

2. The method of claim 1, wherein said turbine generators convert the kinetic energy of waste water to electrical energy.

3. The method of claim 2, wherein said electrical energy is conducted back to a power grid.

4. The method of claim 1, further comprising accommodating sudden increases of water flow via a computer-controlled flapper gate.

5. The method of claim 4, further comprising directing water, via said flapper gate, to the turbine generators in case of sudden increases of water.

6. The method of claim 4, further comprising feathering blades to allow water to exit.

7. The method of claim 4, further comprising allowing water to drain faster as the volume of water continues to increase by feathering two outside turbine generators via the computer.

* * * * *